(12) United States Patent
Albrecht (10) Patent No.: US 10,320,743 B2
(45) Date of Patent: Jun. 11, 2019

(54) METHOD FOR DIAGNOSING THE AVAILABILITY OF NETWORK SUBSCRIBERS IN AN IP-BASED NETWORK

(71) Applicant: Siemens Aktiengesellschaft, Munich (DE)

(72) Inventor: Herald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 734 days.

(21) Appl. No.: 14/943,083

(22) Filed: Nov. 17, 2015

(65) Prior Publication Data

US 2016/0173442 A1    Jun. 16, 2016

(30) Foreign Application Priority Data

Dec. 16, 2014    (EP) .................................... 14198222

(51) Int. Cl.
*H04L 29/12* (2006.01)
*H04L 12/26* (2006.01)

(52) U.S. Cl.
CPC ...... *H04L 61/2046* (2013.01); *H04L 43/0805* (2013.01); *H04L 43/0811* (2013.01); *H04L 61/10* (2013.01)

(58) Field of Classification Search
CPC . H04L 61/2046; H04L 61/10; H04L 43/0805; H04L 43/0811
See application file for complete search history.

(56) References Cited

U.S. PATENT DOCUMENTS

2008/0089330 A1    4/2008  Ballantyne

FOREIGN PATENT DOCUMENTS

| CN | 101674665 | 3/2010 |
| CN | 101877660 | 11/2010 |
| CN | 102801825 | 11/2012 |

OTHER PUBLICATIONS

Thaler et al., Default Address Selection for Internet Protocol Version 6 (IPv6), Sep. 2012, RFC 6724, pp. 1-32.*
Kivinen Safenet T et al.; "Design of the MOBIKE Protocol; draft-ietf-mobike-design-02.txt"; Bd. MOBIKE NR. 2; XP015038651; ISSN: 0000-0004; 2005;.

(Continued)

*Primary Examiner* — Siming Liu
(74) *Attorney, Agent, or Firm* — Cozen O'Connor (57) ABSTRACT

A method for diagnosing availability of network subscribers in an IP-based network in which each subscriber is allocated, in one or more address ranges, at least one address at which the subscriber is available to another subscriber. Each of first and second subscribers has a respective first address allocated in the address ranges, and a guideline stored in the each subscriber stipulates which allocated addresses must be used for communication with other subscribers. The check on availability of the second to the first subscriber prompts the first subscriber to resolve a name of the second subscriber; the result obtained is the addresses of the address range(s) allocated to the second subscriber, and an address list is produced from the result. For each address in the address list, separate examination of the communication capability between the first and second subscribers is performed, and the result is evaluated.

19 Claims, 3 Drawing Sheets

(56) References Cited

OTHER PUBLICATIONS

Chown T J et al:; "Considerations for IPv6 Address Selection Policy Changes; draft-ietf-6man-addr-select-considerations-05.txt"; Internet Society (ISOC); XP015091698; pp. 1-18; 2013;.
Narten T. et al; Neighbor Discovery for IP version 6 (IPv6); Network Working Group; RFC4861.txt; pp. 1-97; ISSN: 0000-003; XP015052407; 2007;.
Anonymus: "IPv6 in der Automatisierungstechnik"; URL: http://www.siemens.com/press/pool/de/materials/industriy/iaa/whitepapers/withepaper-ipv6-d.pdf; pp. 1-13; XP055140595; 2013;.
Kivinen T. et al.: "Design of the MOBIKE Protocol draft-ietf-mobike-design-01.txt"; IKEv2 Mobility and Multihoming; Internet-Draft; Jul. 1, 2005; Dec. 31, 2004; pp. 1-32; 2004;.
Draves R.: "Default Address Selection for Internet Protocol version 6 (IPv6)"; Feb. 2003; pp. 1-25; Network Working Group; Request for Comments 3484; 2003;.
Office Action dated Aug. 1, 2018 issued in corresponding Chinese Patent Application No. 201510924497.0.

\* cited by examiner

METHOD FOR DIAGNOSING THE AVAILABILITY OF NETWORK SUBSCRIBERS IN AN IP-BASED NETWORK

BACKGROUND OF THE INVENTION

1. Field of the Invention

The present invention relates to a method for diagnosing the availability of network subscribers in an IP-based network, in which each of the network subscribers can be allocated, in one or more address ranges, at least one respective address at which the relevant network subscriber is available to another network subscriber. The invention additionally relates to a network subscriber carrying out the method, and to an IP-based network, particularly an IPv6-based network.

2. Background of the Invention

In IPv6-based networks, a plurality of addresses in a plurality of address ranges (what are known as address levels) may be in use simultaneously by a single network subscriber. This is used in practice particularly in smaller industrial automation networks with access to the internet. Typically, four address ranges are then simultaneously in use, namely one LLA (Link-Local Address), one ULA (Unique Local Address) and two GUAs (Global Unicast Addresses). In the field of industrial automation networks, for example, but also in other applications, the simultaneous use of a plurality of address ranges accommodates separate addresses for IT components and for automation components. By way of illustration, for IT components, global addresses for service activities can be provided from outside the automation network, whereas the addresses allocated to automation can be viewed and administered without IT planning operations. Thus, automation addresses can be used and administered autonomously, i.e. without use or inspection by IT experts. Networks of this type are currently structured such that it is possible to access addresses reserved for automation only on site; remote maintenance from locations outside of the network is not possible.

In principle, however, it would be desirable if, in the future, additional addresses or address ranges could be temporarily activated, for example for remote services, so as to thereby allow external network subscribers intermittent access to a restricted number of network subscribers, such as automation devices.

The fundamental availability of network subscribers, such as automation components, in an IPv4-based network is determined with a diagnosis tool that uses what are known as pings. If the ping is successful, the device is deemed to be fundamentally available. However, IP networks regularly involve the use of just one address range, which means that it is relatively easy to check whether two network subscribers can communicate with one another. To this end, a further network subscriber, such as a diagnosis computer, checks the availability of each network subscriber individually using pings. From a technical point of view, this is accomplished by using what are known as ICMP Echo messages. If the diagnosis computer reaches the network subscribers, then they are considered to also be able to communicate with one another in the IPv4 network.

This rigid and straightforward conclusion is normally not valid in IPv6 networks. This is because, in order to communicate with another network subscriber, it is necessary for a network subscriber to make a selection as between the available addresses of the two network subscribers. This choice is additionally influenced by the guidelines that are locally maintained on the network subscribers, which are for the most part advantageously of the same type for all of the network subscribers within a network. However, configuration errors or local requirements may mean that these guidelines may also differ.

The result of this is that, when the availability of network subscribers is investigated or determined in the manner described above in an IPv6 network by the diagnosis computer, the two network subscribers may in fact be perfectly available. Nevertheless, the connection setup and hence the communication between the network subscribers may be disrupted, since there is no check on the actual communication path between the network subscribers or on the guidelines that are stored on the respective network subscribers. Yet the applications installed on the network subscribers must observe these ancillary conditions.

The check on the actual communication path between the two network subscribers requires a technical facility in situ, i.e. the diagnosis computer must be connected to at least one of the two network subscribers directly for checking purposes. Owing to the often long distances between the individual network subscribers in an industrial automation network, this is normally not feasible. However, even if the diagnosis computer is available in situ, in order to determine the availability of another network subscriber from one network subscriber, difficulties from the problems described above cannot be totally ruled out.

By way of example, pings can be used to check the address in a first address range and to confirm it to be correct. If the local guidelines are not taken into consideration, however, the result of that check is incomplete, which may lead to problems in the communication sequence.

SUMMARY OF THE INVENTION

It is accordingly an object of the present invention to provide a method for diagnosing the availability of network subscribers in an IP-based network, and particularly in an IPv6-based network, and as well to provide a network subscriber and a corresponding network, all that are configured and arranged to prevent or at least reduce the difficulties, uncertainties and drawbacks present in the prior art as, for example, hereinabove described.

In accordance with a first aspect of the present invention, a method for diagnosing the availability of network subscribers in an IP-based network, particularly an IPv6-based network, is provided in which each of the network subscribers can be allocated, in one or more address ranges, at least one respective address at which the relevant network subscriber is available to another network subscriber.

The network includes a plurality of network subscribers, including a first network subscriber or node that has a respective first address allocated in at least one of the address ranges, and a guideline (what is known as an Address Selection Policy, ASP) that is stored in the first network subscriber and stipulates which of the allocated first addresses needs to be used for communication with the other network subscribers. The network further includes a second network subscriber or node that has a respective second address allocated in at least one of the address ranges, and a second guideline (ASP) that is stored in the second network subscriber and stipulates which of the allocated second addresses needs to be used for communication with the other network subscribers. The first and second guidelines are local guidelines for the respective first and second network subscribers. The first and second network subscribers are, as contemplated by way of illustrative example in this description and disclosure of the invention, automation components such as field devices.

Checking the availability of the second network subscriber to the first network subscriber involves the performance of the following steps:

a) the first network subscriber resolves a name of the second network subscriber, wherein the result obtained for the name resolution is at least the addresses of the address range(s) that are allocated to the second network subscriber;

b) an address list is produced from the addresses obtained in step a);

c) for each of the addresses that the address list contains, separate examination of the communication capability between the first network subscriber and the second network subscriber is performed; and d) the result of the examination is evaluated and provided.

The foregoing method of the present invention thus no longer checks just a single address range (also known as an address level) to assess the availability of a network subscriber, but rather checks all meaningful address ranges associated with that subscriber. As a consequence, examination of the availability of network subscribers in an IP-based network requires no knowledge of the mechanisms of the network. This simplifies error searching in IP-based networks, particularly IPv6-based networks, for an administrator. In particular, administrators are relieved of the need for special IT knowledge.

A further advantage of the inventive method is that error analysis and the diagnosis of errors can be effected more accurately and more quickly. Incorrect, negative diagnoses, moreover, can be avoided.

These advantages are attained by the automatic checking of all possible address ranges and their addresses without having to accomplish this individually by a user.

The inventive method allows for diagnosis of the availability of network subscribers to be relocated to the network subscribers themselves. This ensures that the check on the addresses is based on the same local device configuration as that on which connections are also set up later between distributed applications running on the network subscribers.

A further advantage of the inventive method is its utility in diagnosing and checking in IPv6-based networks, of which there is increased acceptance as compared with IPv4-based networks in automation engineering, with improved more reliable results.

The check on the availability of the second network subscriber is performed by a diagnosis application that is executed on the first network subscriber. The diagnosis application can be provided as software or hardware. The diagnosis application performs the inventive method by interchanging messages with an IP stack of the first network subscriber directly or via a web server or is designed to interchange messages therewith. In the first case, the diagnosis application is designed to carry out the diagnosis of the availability of network subscribers autonomously. In the second variant, in which the diagnosis application interchanges messages with an IP stack via a web server, the diagnosis application can be controlled or inspected by means of a diagnosis computer that is connected to the network or communicatively connected thereto. Access via a man/machine interface of the first network subscriber is also possible.

In a further embodiment, the name of the second network subscriber is resolved by a means for name resolution that runs DNS (Domain Name System) and/or mDNS (multicast Domain Name System) and/or Profinet DCP (Profinet Dynamic Configuration Protocol). The name of the second network subscriber is resolved in step a) of the method described above.

The address list is produced such that it comprises respective associated source addresses of the first network subscriber for the obtained addresses of the second network subscriber. Source addresses are suitably associated on the basis of RFC 6724 or RFC 3484, for example.

The address list is expediently produced using weighted sorting, so that the obtained addresses are sorted in ascending or descending order in accordance with their availability. The address sorting can be carried out on the basis of RFC 6724, for example. The result obtained for the process of address sorting is then a weighted list of destination network subscriber addresses (i.e. the obtained addresses) with associated source network subscriber addresses. In this case, it is expedient if the sorting of the address list is stipulated by processing the guideline that is stored in the first network subscriber.

The guidelines that are stored in the respective network subscribers are read by the diagnosis application and/or other applications, e.g. via a local program interface, after the guideline has previously been transmitted to the network subscribers, e.g. by an RFC-compliant mechanism such as DHCPv6.

The communication capability between the first network subscriber and the second network subscriber is examined by a diagnosis tool that sends a ping to each obtained address of the second network subscriber in parallel or sequentially. To this end, the diagnosis tool can comprise one or more ping units that carries out the examination of the communication capability for each address in each address range separately.

Sequential sending of the pings prompts the sending to the obtained addresses preferably in the order of their weighted sorting. Alternatively, sequential sending of the pings can prompt the sending to the obtained addresses in other than the order of their weighted sorting. This may be necessary for faster inspection or diagnosis of availability, for example. Such a case exists when there are equally weighted addresses in a or different address ranges, for example.

If pings are intended to be sent to each obtained address of the second network subscriber in parallel, a corresponding number of ping units must be provided in the diagnosis tool. The pings units may be in the form of software components and be designed to send ICMP Echo messages.

The communication capability between the first network subscriber and the second network subscriber can be examined, in accordance with a further embodiment, under the control of a computation unit that controls the diagnosis tool. The task of the computation unit is to control the parallel or sequential process of sending the pings. The diagnosis tool can be controlled particularly in consideration of load limiting rules. By way of example, the maximum number of parallel pings per test can be limited to 10, such that it is not possible for more than 10 addresses to be addressed simultaneously. If more than 10 addresses need to be tested, the remaining addresses are then processed in blocks of 10. Furthermore, it is also possible to spread the sending of the parallel pings. In that case, the 10 test pings in a block are not sent "exactly" simultaneously, but rather with a (for example) 10 ms stagger in each case, so as to avoid short bursts.

For each address range, only one of the obtained addresses of the second network subscriber can be examined. This is useful in the case described above when there are equally weighted addresses for an address range.

According to a further embodiment of the inventive method, an examined address is denoted as unavailable when it has no existing associated source address of the first network subscriber. In this connection, source addresses are by definition those IP addresses that are associated with ("tied" to) the IP interfaces of that network subscriber that wishes to send an IP packet. In this case, source addresses are produced and tied to IP interfaces in various ways—as, by way of example, by SLAAC, DHCP, or manual configuration.

According to a further embodiment, the result of the examination can be stored in a result memory that is read by the diagnosis application following performance of the examination and provides the results of the examination, particularly in the form of a list. By way of example, these results can be provided in visual, readable form, their review being carried out by an administrator. This can prompt a plurality of examined addresses that are associated with one and the same address level to be combined in the results, particularly the list.

In accordance with a second aspect of the invention, each network subscriber in an IP-based network, particularly an IPv6-based network, is allocated, in one or more address ranges, at least one respective address at which the network subscriber is available to another network subscriber. The network includes a first network subscriber that has a respective first address allocated in at least one of the address ranges, wherein a first guideline that is stored in the first network subscriber stipulates which of the allocated first addresses needs to be used for communication with the other network subscribers. The network additionally includes a second network subscriber that has a respective second address allocated in at least one of the address ranges, wherein a second guideline that is stored in the second network subscriber stipulates which of the allocated second addresses needs to be used for communication with the other network subscribers. The network subscriber acting as the first network subscriber has:

a) a first means for resolving a name of the second network subscriber, wherein the result obtained for the name resolution is at least the addresses of the address range(s) that are allocated to the second network subscriber;

b) a second means for producing an address list from the addresses obtained in step a);

c) a third means that, for each of the addresses that the address list contains, performs separate examination of the communication capability between the first network subscriber and the second network subscriber; and d) a fourth means for evaluating and providing the result of the examination.

A network subscriber in accordance with the invention enjoys and benefits from the same advantages as have been described above in connection with the method of the invention. In particular, the network subscriber may additionally include further means for performing the optional method steps described above.

In accordance with a third aspect of the invention, an IP-based network, particularly an IPv6-based network, includes a plurality of network subscribers, each of which can be allocated, in one or more address ranges, at least one respective address at which the network subscriber is available to another network subscriber. The network includes a first network subscriber that has a respective first address allocated in at least one of the address ranges, wherein a first guideline that is stored in the first network subscriber stipulates which of the allocated first addresses needs to be used for communication with the other network subscribers. The network additionally includes a second network subscriber that has a respective second address allocated in at least one of the address ranges, wherein a second guideline that is stored in the second network subscriber stipulates which of the allocated second addresses needs to be used for communication with the other network subscribers. In accordance with the invention, the first network subscriber is implemented as described above.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several embodiments and figures.

DETAILED DESCRIPTION OF THE PRESENTLY PREFERRED EMBODIMENTS

Figure 1:
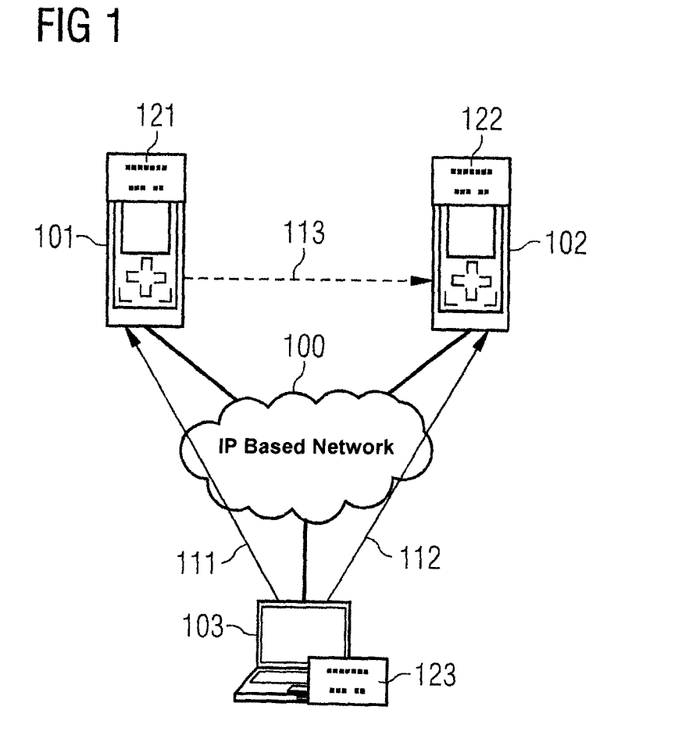
FIG. 1 schematically depicts of an IP-based industrial automation network in accordance with the invention with two network subscribers and a diagnosis computer.

FIG. 1 is a schematic illustration of an IP-based network 100 to which, by way of example, two network subscribers 101, 102 in the form of automation components (e.g. field devices) and a network subscriber 103 in the form of a diagnosis computer are connected. The network 100 as herein described is, by way of example, an IPv6-based network, which thus allows each of the network subscribers 101, 102, 103 to be allocated one or more addresses in a plurality of address ranges (what are known as address levels). By way of illustration, the following can be used simultaneously as address ranges: LLA, ULA and GUA. Furthermore, additional address ranges can be used, at least temporarily, which allows external network subscribers to be permitted intermittent access to a restricted quantity of network subscribers.

So that the network subscriber 101 (also referenced herein as the first network subscriber 101) can communicate with the network subscriber 102 (also referenced herein as the second network subscriber 102), the first network subscriber 101 must make a selection between the available addresses at the first network subscriber 101 and at the second network subscriber 102. This choice is influenced by guidelines 121 (the first guideline), 122 (the second guideline), and 123 (the third guideline) that are stored locally on the respective network subscribers 101, 102, 103. Each of the first, second and third guidelines 121, 122, 123 is also referred to as an Address Selection Policy, ASP. The guidelines 121, 122, 123 are ideally of the same type within the network 100. Owing to configuration errors or local requirements, the guidelines 121, 122, 123 may differ from one another.

FIG. 1 illustratively depicts a network in which a conventionally used check on the availability of the network subscribers 101 and 102 is effected using the network subscriber 103. The fundamental availability of the network subscribers 101, 102 is checked using a diagnosis tool in the form of a ping program that is installed and runs on the third network subscriber 103, i.e. the diagnosis computer in the network shown in FIG. 1. To this end, an ICMP Echo message 111 (i.e. a ping) is transmitted to the first network subscriber 101 and a corresponding ICMP Echo message 112 (i.e. a ping) is transmitted to the second network subscriber 102, and the messages are evaluated. If a response to the ping is received in each case, then a possible communication capability between the first network subscriber 101 and the second network subscriber 102 is inferred. However, this inference is only admissible if the network does not permit the use of address ranges.

In IPv6 networks, however, this conclusion is normally not possible. The reason is that the first network subscriber 101, in order to communicate with the second network subscriber 102, must make a selection between the available addresses or address ranges of the first and second network subscribers 101, 102, which are influenced by the aforementioned first and second guidelines 121, 122. In the case of the above-described individual check on the availability of the first network subscriber 101 and the second network subscriber 102 by a separate diagnosis computer, the two network subscribers may be found to be available to the diagnosis computer 103, for example because the ping to the first network subscriber 101 at an address in the address range GUA is successful. Correspondingly, a ping to the second network subscriber 102 at an address in the address range GUA may also be successful, for example. However, the first and second guidelines prescribe that communication between the first and second network subscribers 101, 102 must take place via an address in the address range ULA, for example. Hence, even though the diagnosis computer 103 has been able to establish the availability of the first and second network subscribers, communication between the two network subscribers 101, 102 may nevertheless not be possible owing to the failure to consider the content of the first and second guidelines 121, 122, since the actual communication path between the first and second network subscribers 101, 102 has not been checked.

The process described below with reference to FIGS. 2 to 4 avoids such uncertainty in diagnosing the availability of network subscribers in an IPv6-based network. The process is based on no longer just a single address but rather all addresses in the address ranges used in the network being checked. This requires no knowledge of the mechanisms of IPv6. The error search in IPv6 networks can thus be reduced or even rendered superfluous. The check on all possible addresses in the address ranges is carried out without needing to be performed manually or individually by a user. As a result, the inventive process is efficient in terms of time.

This advantageous functionality is rendered possible by virtue of the diagnosis being relocated to the network subscribers themselves. This can ensure that a check on the address(es) in the different address ranges is based on respective local configurations that are later also used to set up connections between distributed applications of the network subscribers. This is denoted symbolically in FIG. 1 by the path, denoted by 113, between the first and second network subscribers 101, 102.

Figure 2:
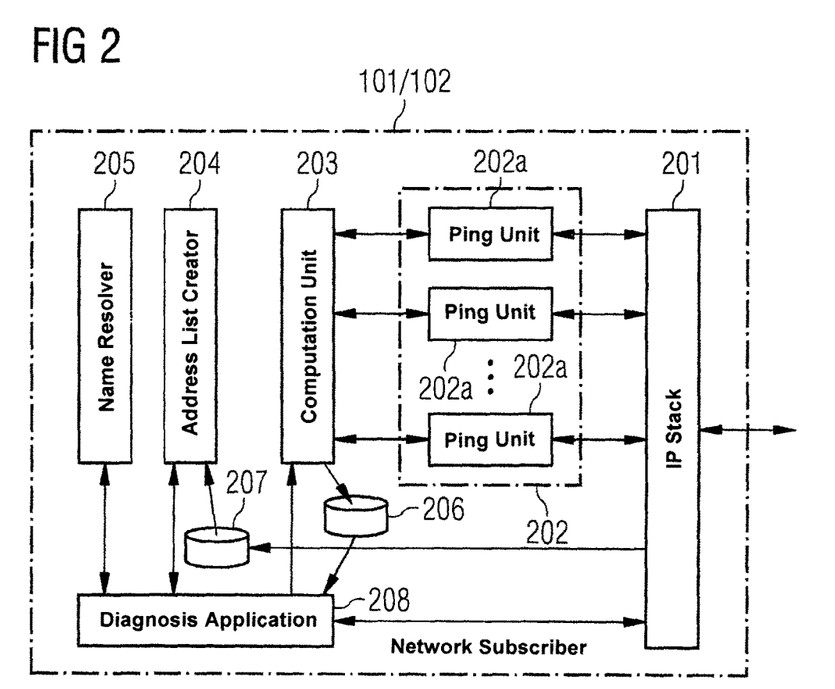
FIG. 2 schematically depicts a network subscriber in accordance with the invention.
Figure 3:
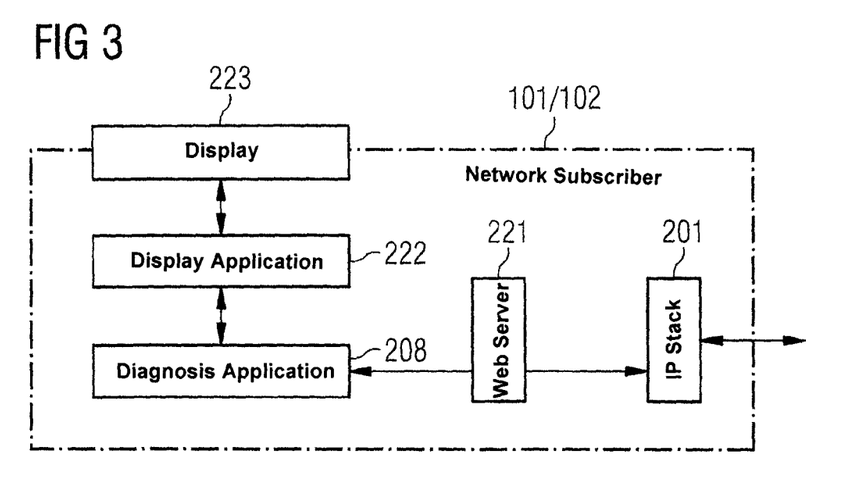
FIG. 3 schematically depicts an alternative form of a portion of a network subscriber in accordance with the invention.

FIG. 2 represents a network subscriber in accordance with the invention and providing or accommodating this functionality. The network subscriber of FIG. 2 may be the first and/or the second network subscriber 101, 102. The network subscriber 101, 102 thus includes an IP stack 201 by means of which the subscriber is linked to the network 100 of FIG. 1. In addition, the network subscriber 101, 102 includes a diagnosis tool 202, a computation unit 203 for controlling the diagnosis tool 202, a means 204 for creating an address list, a means 205 for name resolution, a result memory 206, a memory 207 for the first and second guidelines 121, 122, and a diagnosis application 208. The flow of communication taking place between the individual components of the network subscriber of FIG. 2 is denoted by corresponding arrows, with a double-headed arrow symbolizing bidirectional communication and a single-headed arrow symbolizing unidirectional communication in the direction of the arrow tip.

The diagnosis application 208 may, as shown in FIG. 2, be connected to the IP stack 201 directly, so that the process described below can be controlled or monitored by a user using a separate diagnosis computer that is connected to the network 100 as a network subscriber. Alternatively, the diagnosis application 208 may also, as shown schematically in FIG. 3, be connected to the IP stack 201 via a web server 201. In this case, the operation of the diagnosis application 208 can be controlled or monitored using a remote diagnosis computer that is connected to the network via the internet. When a display 223 and a display application 222 (FIG. 3) are present, monitoring and control can take place on the network subscriber 101, 102 directly. In addition, the diagnosis application 208 is connected to the computation unit 203, to the means 204 for creating the address list and to the means 205 for name resolution for the purpose of interchanging data.

The result memory 206 can be read by the diagnosis application 208. The result memory 206 is written to by the computation unit 203.

The memory 207 storing the first or the second guideline 121, 122 is written to via the IP stack 201. The first or second guideline 121, 122 can either be configured locally or written to the memory 207 using RFC-compliant mechanisms, such as DHCPv6.

The means 204 for creating the address list is set up to read and process the first or second guideline 121, 122 stored in the memory 207.

The computation unit 203 is used for controlling the diagnosis tool 202, which has one or more ping units 202a. When a plurality of ping units 202a are present, each of the ping units 202a is actuated by the computation unit 203 directly. Accordingly, each of the ping units 202a communicates with the IP stack 201.

If the communication between the first and second network subscribers 101, 102 now needs to be checked, then the diagnosis application 208, e.g. of the first network subscriber 101, is accessed. The diagnosis application 208 is accessed either via the IP stack 201 by a diagnosis computer 103 connected to the network 100, or alternatively via the web server 221, or alternatively when an appropriate man/machine interface (comprising the display 223 and the display application 222) is present, on the first network subscriber 101 directly.

In a first method step S1 (FIG. 4), the diagnosis application 208 initiates resolution of the symbolic device name of the second network subscriber 102 using the inherently known means 205 for name resolution. The means 205 for name resolution is a name resolver. By way of example, this can be accomplished using DNS, mDNS or Profinet DCP as technical mechanisms. As the result of the name resolution, the addresses in the address range(s) that are allocated to the second network subscriber 102 are transmitted from the means 205 to the diagnosis application 208.

In a second method step S2, the obtained addresses are transmitted via the diagnosis application 208 to the means 204 for creating an address list, and an address list is produced. The means 204 executes address sorting which may take place on the basis of RFC 6724. In this case, the means 204 performs weighting of the obtained addresses of the second network subscriber 102 and the respective associated source addresses of the first network subscriber 101. The weighting, which results in the sorted address list, is effected in accordance with the probability of the second network subscriber 102 being available, for example. The process for producing the address list that is performed by the means 204 uses the first guideline 121 that the memory 207 contains. To this end, the means 204 accesses the memory 207.

In a third method step S3, the diagnosis application 208 now controls the computation unit 203 using the address list of the address(es) of the second network subscriber that is obtained from the means 204. The computation unit 203 uses the ping units 202a of the diagnosis tool 202 to carry out the examination of the communication capability for each of the address(es) in the address ranges in consideration of any load limiting rules. In this case, the computation unit 203 is responsible for processing the address list of obtained addresses. In some circumstances, the computation unit can deviate from the weighted order of the address list if this is useful for faster inspection of the diagnosis of availability, as for example when there are equally weighted addresses in a or different address range(s). In such circumstances, it suffices to check the availability of just one respective address in a respective address range.

The weighting described above can result in an address of the second network subscriber 102 being identified as unavailable if a suitable, associated address of the first network subscriber 101 does not exist therefor. For such instances, unavailability can be inferred directly. A check by a ping unit 202a is then dispensed with.

The ping units 202a use the known, RFC-standardized ping protocol, which is known as ICMPv6 Echo. This inspects the availability of a particular address in an address range.

In a method step S4, the results of the availability examinations are stored in the memory 206, where they are read and conditioned by the diagnosis application 208. The result can then be visually displayed by means of the display application 222 or the web server 221 for the purpose of inspection by a user. In this case, it is possible to combine addresses from areas of the same type in order to improve comprehensibility.

Figure 4:
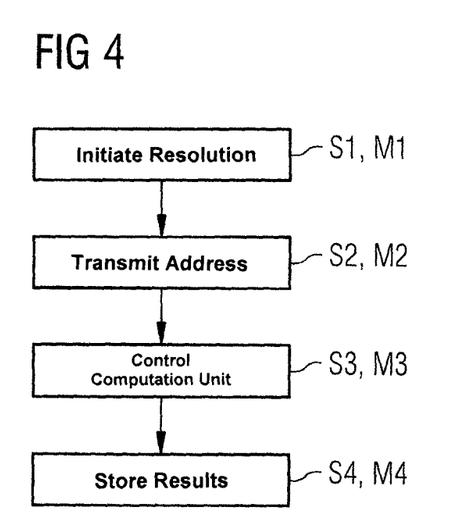
FIG. 4 is a flowchart of a method in accordance with the invention.

FIG. 4 visualizes the method sequence of the mode described above. Step S1 is performed by a first means M1 that comprises the diagnosis application and the means 205 for name resolution. Step S2 is carried out by a second means M2 that comprises the diagnosis application 208 and the means 204. Step S3 is carried out by a third means M3 that comprises the diagnosis tool 202 and the computation unit 203. Step S4 is carried out by a fourth means M4 that comprises the computation unit 203 and the diagnosis application 208.

While there have been shown and described and pointed out fundamental novel features of the invention as applied to preferred embodiments thereof, it will be understood that various omissions and substitutions and changes in the form and details of the devices illustrated and in their operation, and in the methods of the invention, may be made by those skilled in the art without departing from the spirit of the invention. It is the intention, therefore, to be limited only as indicated by the scope of the claims appended hereto.

What is claimed is:

1. A method for diagnosing the availability of network subscribers in an internet-protocol (IP) based network, in which each of the network subscribers is allocated, in one or more address ranges, at least one respective address at which the each network subscriber is available to another network subscriber, wherein the network includes:
   a first network subscriber including a first diagnostic application and having at least one respective first address allocated in at least one of the address ranges, a first guideline stored in the first network subscriber stipulating which of the allocated first addresses needs to be used for communication with other network subscribers; and
   a second network subscriber including a first diagnostic application and having at least one respective second address allocated in at least one of the address ranges, a second guideline stored in the second network subscriber stipulating which of the allocated second addresses needs to be used for communication with the other network subscribers, the method comprising checking the availability of the second network subscriber to the first network subscriber by:
   a) resolving, by the first network subscriber, a name of the second network subscriber to obtain addresses of address ranges allocated to the second network subscriber;
   b) producing an address list from the obtained addresses;
   c) for each of the addresses in the produced address list, performing a separate examination of the communication capability between the first network subscriber and the second network subscriber; and
   d) evaluating and providing a result of the examination.

2. The method as claimed in claim 1, wherein the method of checking the availability of the second network subscriber to the first network subscriber is performed by a diagnosis application which is executed on the first network subscriber.

3. The method as claimed in claim 2, wherein the diagnosis application performs the method of checking the availability by interchanging messages one of with an IP stack directly and via a web server.

4. The method as claimed in claim 2, wherein the guideline stored in each respective network subscriber is read by the diagnosis application.

5. The method as claimed in claim 1, wherein the name of the second network subscriber is resolved by a name resolver which executes one or more of Domain Name System (DNS), multicast Domain Name System (mDNS) and Profinet Dynamic Configuration Protocol (DCP).

6. The method as claimed in claim 1, wherein the address list is produced such that it comprises respective associated source addresses of the first network subscriber for the obtained addresses of the second network subscriber.

7. The method as claimed in claim 1, in which the address list is produced using weighted sorting, so that the obtained addresses are sorted in ascending or descending order in accordance with their availability.

8. The method as claimed in claim 7, in which the sorting of the address list comprises processing of the guideline which is stored in the first network subscriber.

9. The method as claimed in claim 1, wherein the examination of the communication capability between the first network subscriber and the second network subscriber is performed by a diagnosis tool which sends a ping to each obtained address of the second network subscriber in one of parallel and sequentially.

10. The method as claimed in claim 9, wherein the address list is produced using weighted sorting of the obtained addresses, and wherein pings are sent by the diagnosis tool to the obtained addresses sequentially in an order of the weighted sorting.

11. The method as claimed in claim 9, wherein the address list is produced using weighted sorting of the obtained addresses, and wherein pings are sent by the diagnosis tool to the obtained addresses sequentially in an order different from the weighted sorting.

12. The method as claimed in claim 9, wherein the examination of the communication capability between the first network subscriber and the second network subscriber is performed under control of a computation unit which controls the diagnosis tool.

13. The method as claimed in claim 12, wherein the diagnosis tool is controlled in consideration of load limiting rules.

14. The method as claimed in claim 9, wherein only one of the obtained addresses of the second network subscriber is examined for each address range of the second network subscriber.

15. The method as claimed in claim 9, wherein an examined address is denoted as unavailable if it has no existing associated source address of the first network subscriber.

16. The method as claimed in claim 1, wherein a result of the examination is stored in a result memory which is read by a diagnosis application which is executed on the first network subscriber, and the result of the examination is provided as a list.

17. The method as claimed in claim 16, wherein a plurality of examined addresses that are associated with a same address level are combined in the result list.

18. A network subscriber for an internet-protocol (IP) based network, in which each of a plurality of network subscribers is allocated, in one or more address ranges, at least one respective address at which the each network subscriber is available to another network subscriber, wherein the network (100) includes:
   a first network subscriber including a first diagnostic application and having at least one respective first address allocated in at least one of the address ranges, a first guideline stored in the first network subscriber stipulating which of the allocated first addresses needs to be used for communication with other network subscribers;
   a second network subscriber including a first diagnostic application and having at least one respective second address allocated in at least one of the address ranges, a second guideline stored in the second network subscriber stiuplating which of the allocated second addresses needs to be used for communication with the other network subscribers, the network subscriber being the first network subscriber (101) and comprising:
   a) a name resolver which resolves a name of the second network subscriber, the result obtained for the name resolution being addresses of address ranges allocated to the second network subscriber (102);
   b) an address list producer which produces an address list from the obtained addresses;
   c) an examiner which performs, for each of the addresses in the address list, a separate examination of communication capability between the first network subscriber and the second network subscriber; and
   d) an evaluator which evaluates and provides a result of the performed examination.

19. An internet-protocol (IP) based network having a plurality of network subscribers, in which each of the network subscribers is allocated, in one or more address ranges, at least one respective address at which the each network subscriber is available to another network subscriber, the network comprising:
   a first network subscriber including a first diagnostic application and having a respective first address allocated in at least one of the address ranges, a first guideline stored in the first network subscriber stipulating which of the allocated first addresses needs to be used for communication with other network subscribers; and
   a second network subscriber including a first diagnostic application and having a respective second address allocated in at least one of the address ranges, a second guideline stored in the second network subscriber stipulating which of the allocated second addresses needs to be used for communication with the other network subscribers;
   wherein the first network subscriber (101) comprises:
   a) a name resolver which
      resolves a name of the second network subscriber,
      the result obtained for the name resolution being addresses of address ranges allocated to the second network subscriber;
   b) an address list producer which produces an address list from the obtained addresses;
   c) an examiner which performs, for each of the addresses in the address list, a separate examination of communication capability between the first network subscriber and the second network subscriber; and
   d) an evaluator which evaluates and provides a result of the performed examination.

* * * * *